(No Model.)
2 Sheets—Sheet 1.

J. S. McDANIEL.
STEAM TRAP AND SEPARATOR.

No. 434,675.
Patented Aug. 19, 1890.

Witnesses:
A. V. Groupe.
Murray C. Boyer.

Inventor:
John S. McDaniel
by his Attorneys
Howson & Howson (No Model.) 2 Sheets—Sheet 2.
J. S. McDANIEL.
STEAM TRAP AND SEPARATOR.

No. 434,675. Patented Aug. 19, 1890.

Witnesses:
A. V. Groupe.
Murray C. Boyer

Inventor:
John S. McDaniel
by his Attorneys
Howson & Howson

UNITED STATES PATENT OFFICE.

JOHN S. McDANIEL, OF PHILADELPHIA, PENNSYLVANIA, ASSIGNOR TO HIMSELF AND JAMES WATSON, OF SAME PLACE.

STEAM TRAP AND SEPARATOR.

SPECIFICATION forming part of Letters Patent No. 434,675, dated August 19, 1890.

Application filed April 30, 1890. Serial No. 350,002. (No model.)

*To all whom it may concern:*

Be it known that I, JOHN S. MCDANIEL, a citizen of the United States, and a resident of Philadelphia, Pennsylvania, have invented certain Improvements in Steam Traps and Separators, of which the following is a specification.

The object of my invention is to construct an improved steam trap and separator in which the parts are simple in construction and can be removed for cleaning and repairing, and readily attached to the necessary pipes, as fully described hereinafter. This object I attain in the following manner, reference being had to the accompanying drawings, in which—

Figure 1:
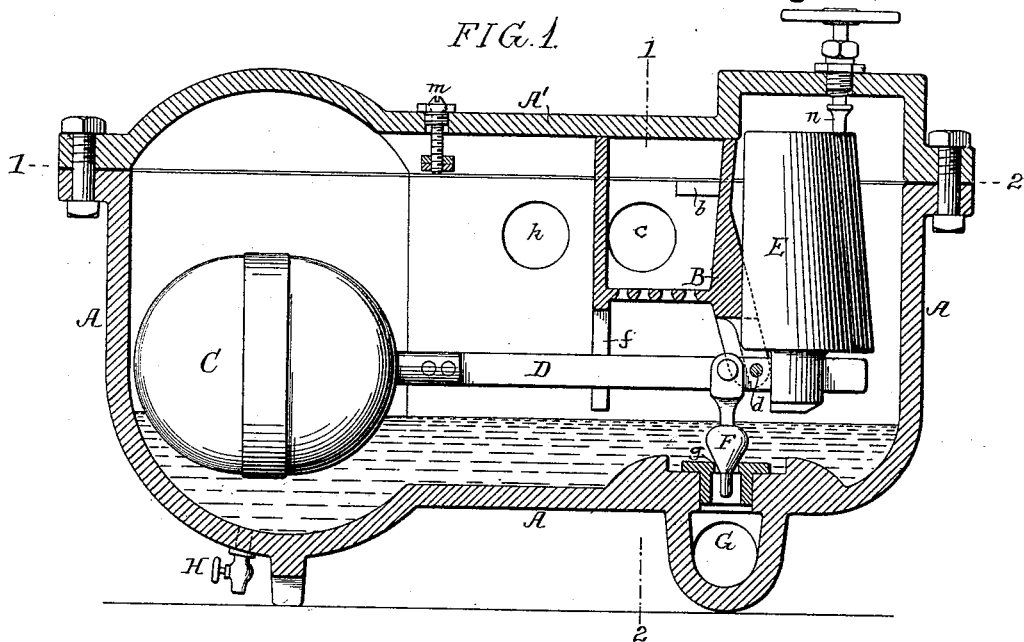
Figure 2:
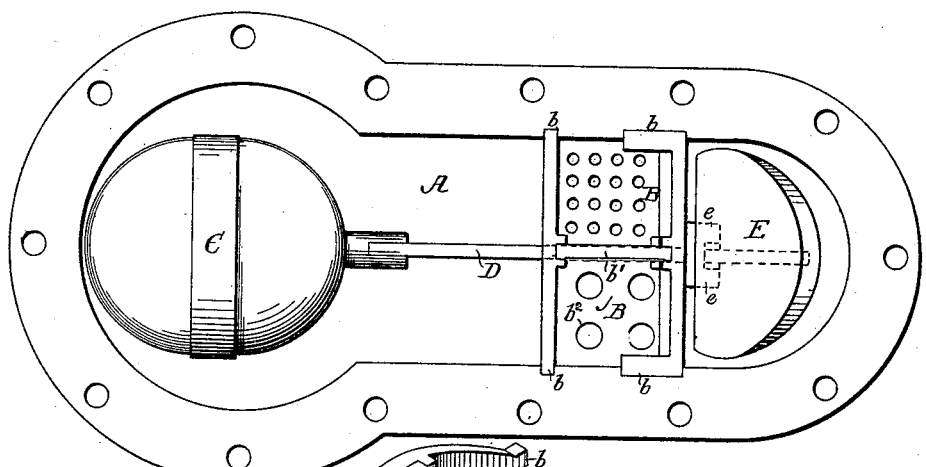
Figure 4:
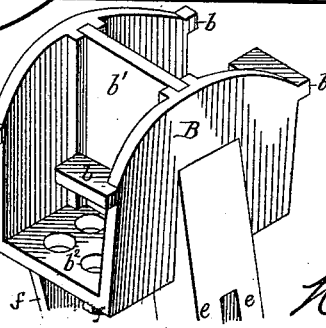
Figure 3:
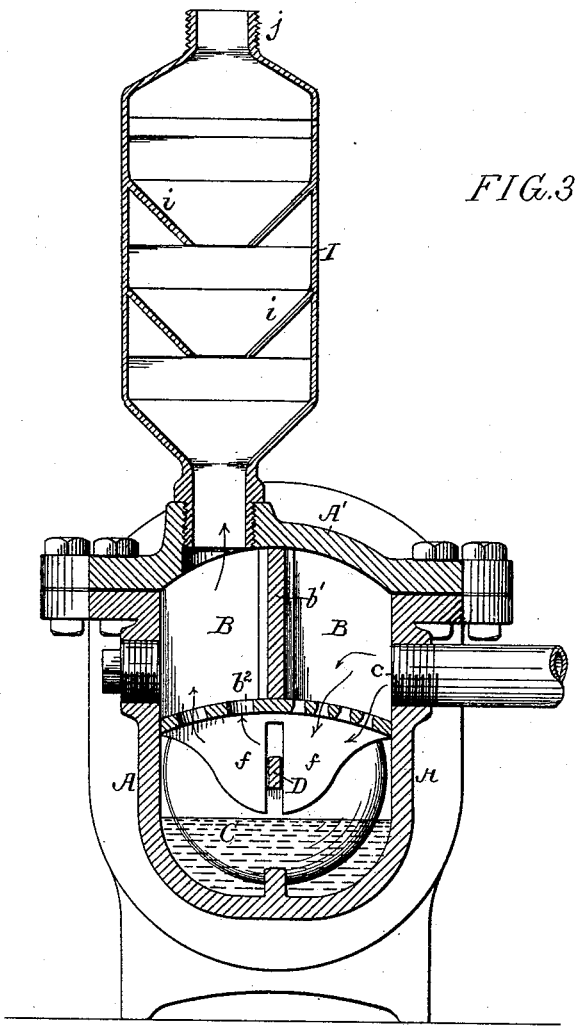

Figure 1 is a longitudinal sectional view of my improved steam trap and separator. Fig. 2 is a plan view with the cover-plate removed. Fig. 3 is a transverse section on the line 1 2, Fig. 1; and Fig. 4 is a perspective view of the receiving-box.

A is the body of the trap, made in the peculiar form shown, being deeper at one end, in order to receive the ball-float C on the long arm of the lever D.

A' is the cover-plate of the trap secured to the body by means of bolts, and I preferably place a packing between the cover and the body so as to make the joints steam-proof.

Suspended in the body A is a receiving-box B, lugs $b$ $b$ on the box resting in suitable cavities in the body of the trap, thus always insuring the proper placing of the box in the trap. The bottom of the box B is preferably perforated, as shown, and I place therein a partition $b'$, separating the box into two compartments, the perforations in the bottom on one side of the partition being fine and the others coarse, although the perforations may all be of the same size; but I have found that in this special construction the openings of different diameters are preferred. In some instances where the separator, which will be described hereinafter, is not used, the partition-plate $b'$ can be removed. On the rear of the box B are two lugs $e$ $e$, and pivoted to these lugs by a pivot-pin $d$ is the lever D, carrying the ball-float C. The short arm of this lever carries the balance-weight E, which is mounted above the water-level of the trap, and fits between the box and the rear of the trap. Depending from the front of the box are two fins $f f$, forming a guide for the lever E, preventing any lateral motion of the same.

F is a valve hung to the lever D in front of its pivot $d$. This valve is adapted to its seat $g$ in the outlet-opening G, which is formed in a projection on the under side of the trap and extends transversely of the same, and the outlet-pipe can be attached either to the right or left hand side of the trap, and the other opening-plug, as fully shown, so as to enable the trap to be placed in any position in respect to the pipes to which it is coupled. Thus it will be seen that by simply removing the cover of the trap and by lifting out the box all the operating parts of the trap are removed and can be readily cleaned and repaired and replaced. One side of the box is the inlet-opening $c$ for the steam, which passes down through the perforated bottom into the trap and up through the larger perforations $b^2$ to the separator I. The separator-casing has a depending nozzle, which is screwed into the opening in the cover-plate, the opening being directly above the compartment in the box opposite the one to which steam is admitted.

The separator I has a series of funnel-like partitions $i$, and its outlet-nozzle $j$ is attached to the steam-pipe leading to the heating-coils or other appliances. Thus the steam as it passes through the separator frees itself from the water likely to be carried up from the trap.

I provide in the lower portion of the trap a blow-off cock H for blowing out the dirt and sediment from the trap. The return steam from the heating system passes into the trap through the opening $h$. This trap is especially applicable for use in steam-heating systems.

In the cover-plate is an air-valve $m$, and a screw-pin $n$ acts as a stop for the counter-balance-weight, and by turning this screw-pin the valve F can be raised off its seat when circumstances require.

I claim as my invention—

1. The combination, in a steam-trap, of the body, a receiving-box adapted to said body, a float-lever pivoted to said box, and a valve hung from said lever, so that on removing the box the float-lever and valve will be removed therewith, substantially as described.

2. The combination, in a steam-trap, of the body having depressions or recesses, a receiving-box having lugs adapted to said depressions, said box having at its rear dependent pivot-lugs and at the front depending guides, with a lever pivoted to said lugs and resting between the guides, said lever having at one end a float and at the opposite end a weight, with a valve depending from said lever, substantially as described.

3. The combination, in a steam-trap, of the receiving-box, a partition therein, perforations in the bottom of said box, with a float and valve, an inlet on one side of said partition and an outlet on the opposite side of said partition, substantially as described.

4. The combination, in a steam-trap, of the box, partition therein, said box having a perforated bottom, the steam-inlet into the box on one side of the partition, with a separator, substantially as described, connecting with the box on the opposite side of the partition, with a float and valve and a water-discharge, all substantially as set forth.

In testimony whereof I have signed my name to this specification in the presence of two subscribing witnesses.

JOHN S. McDANIEL.

Witnesses:
 JNO. E. PARKER,
 HENRY HOWSON.